Dec. 14, 1937.  G. B. GALLASCH  2,101,936

MICROSCOPE

Filed Oct. 9, 1935

GEORGE B. GALLASCH
INVENTOR

BY *J. A. Ellestad*
*B. A. Diggins*
ATTORNEYS

Patented Dec. 14, 1937

2,101,936

UNITED STATES PATENT OFFICE 2,101,936

MICROSCOPE

George B. Gallasch, Rochester, N. Y., assignor to Bausch & Lomb Optical Company, Rochester, N. Y., a corporation of New York Application October 9, 1935, Serial No. 44,240

5 Claims. (Cl. 88—39)

The present invention relates to microscopes and more particularly to microscopes having detachable and interchangeable body tubes.

In using a microscope, it is sometimes desirable to substitute one body tube for another, for example, to substitute a binocular body tube for a monocular body tube. Heretofore microscopes have been constructed with such interchangeable body tubes but the body tube and support were provided with complementary interconnecting members. These members added considerably to the cost of the microscope since they served to align and position the body tube and hence were made with great accuracy and precision.

One of the objects of the present invention is to provide a microscope having a simple and inexpensive yet rugged and accurate means for detachably securing the body tube thereto. Another object is to provide a microscope having a body tube support with a surface of a shape complementary to the shape of the body tube. A further object is to provide a microscope in which the body tube support coacts directly with the body tube to hold it in alignment. These and other objects and advantages reside in certain novel features of construction, arrangement and combination of parts as will hereinafter be more fully set forth and pointed out in the appended claims.

Referring to the drawing.

Figure 1:
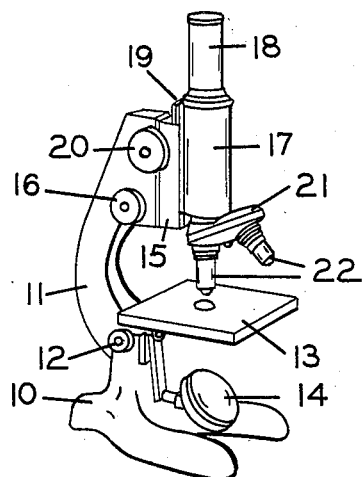
Fig. 1 is a perspective of a microscope embodying this invention.

The present invention can be applied to a microscope of the type shown in Fig. 1 wherein 10 indicates the base upon which the arm 11 is pivotally mounted at 12. The stage 13 and mirror 14 are secured to the lower end of the arm 11 and the block 15 is slidably mounted at the upper end of the arm 11 under the control of the fine adjustment mechanism indicated by the knob 16. The body tube 17 carrying the ocular 18 is removably secured to a support 19 which is slidably mounted in the block 15 under the control of the coarse adjustment mechanism indicated by the knob 20. The nose piece 21 and objectives 22 are likewise carried by the support 19. The structure so far described is conventional, and it is to be understood that the present invention is applicable to other types of microscope than the type described.

In the embodiment illustrated, the body tube 17 is cylindrical and the support 19 has a cylindrical surface 23, of the same curvature as the body tube 17, aligned with the stage 13. A recess 24 is formed in the surface 23 for receiving a stud 25 which is secured to the body tube 17 by a nut 26. The stud 25 is provided with a hole 27 for cooperating with a cam member such as the tapered end 28 of a screw 29 which is threaded into the support 19 and extends into the recess 24. The screw 29 is rotated by means of the knurled head 30 and its tapered end 28 exercises a cam action against the sides of the hole 27 of the stud 25 to draw the body tube 17 tightly into contact with the cylindrical surface 23. Obviously when thus forced against the surface 23, the body tube 17 will be rigid and in proper alignment with the stage.

Figure 2:
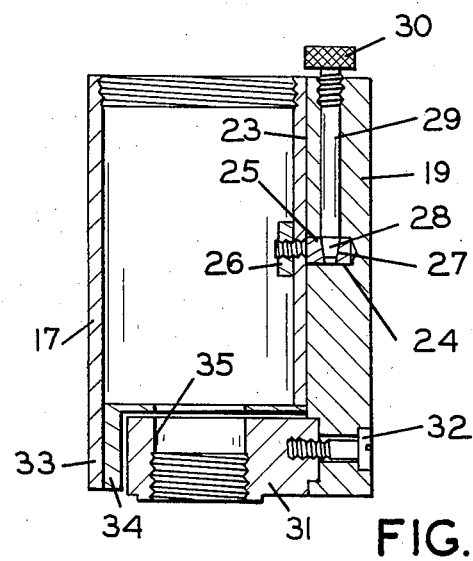
Fig. 2 is a vertical section through the body tube and support.
Figure 3:
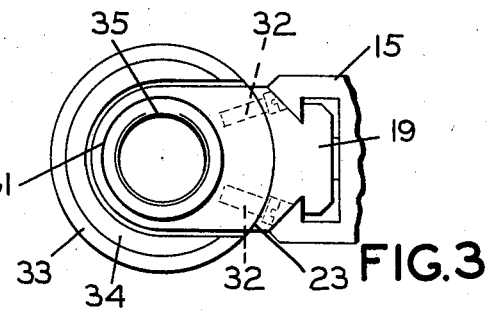
Fig. 3 is a bottom plan view of the body tube and support shown in Fig. 2.
Figure 4:
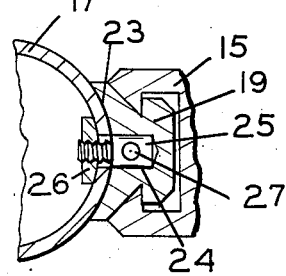
Fig. 4 is a fragmentary vertical section thereof.

In the form shown in Figs. 2 and 3 the objective or nosepiece is secured to a bracket 31 which is permanently secured to the support 19 by screws 32. The lower end of the body tube 17 has a skirt 33 extending downward over the bracket 31, and a shield 34 is suitably fixed within the body tube 17 to prevent the entry of any light except that which enters through the aperture 35 of the bracket 31. In this modification, the body tube 17 can be removed and a different body tube substituted without disturbing the setting of the bracket 31 carrying the objective.

Figure 5:
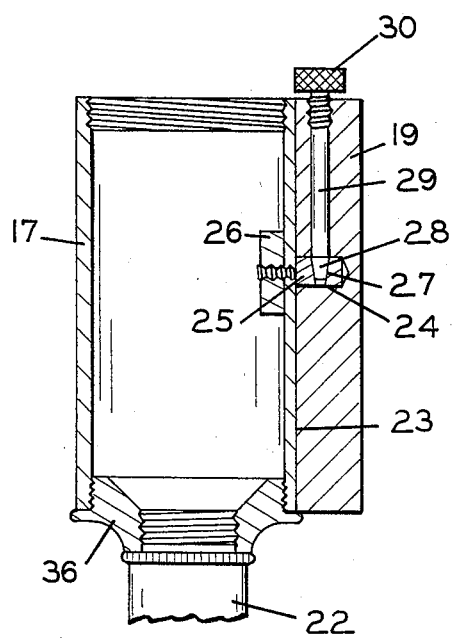
Fig. 5 is a vertical section of a modified form of this invention.

In the modification shown in Fig. 5, the objective 22 or a circular nosepiece 21 is secured to the body tube 17 by means of a reducing nut 36. Here, the objective 22 is removed with the body tube 17 so that the entire optical unit is removed and a new one can be readily substituted.

It is obvious that this invention is not limited to any particular form of microscope stand or to any particular shape of body tube. The body tube 17 may be cylindrical as shown or may be of any other shape, for example, it may be octagonal or hexagonal in cross section. All that is necessary is that the surface 23 of the support 19 be of the same shape as the body tube 17. Furthermore, if desirable, a second stud and recess arrangement could be used between the body tube and support to further aid in aligning the body tube.

From the foregoing, it will be apparent that I am able to attain the objects of my invention and provide a microscope having a simple and inexpensive yet rugged and efficient means for detachably securing the body tube to the stand.

Various modifications can, of course, be made without departing from the spirit of my invention or the scope of the appended claims.

I claim:

1. In a microscope, a cylindrical body tube, a support having a cylindrical surface for receiving said body tube, a stud on said body tube, said stud having a hole, a recess in the cylindrical surface of said support, and a screw threaded in said support perpendicular to said stud and having a tapered end for engaging the hole in said stud to draw said tube against said surface.

2. In a microscope, a body tube, a support having a shaped surface complementary to the surface of the body tube for receiving said body tube, a stud on said body tube, a recess in the shaped surface of said support for receiving said stud and a screw extending into said support, perpendicular to said stud, said screw having a cam surface for engaging said stud to draw said body tube into close engagement with the shaped surface of said support on both sides of said recess.

3. In a microscope, a support having a shaped surface, an objective lens carrier fixedly secured to said support at the lower end of said surface, a body tube having a shape complementary to said shaped surface, and cooperating means on said support and said body tube for releasably clamping said body tube against said shaped surface above said lens carrier, said body tube having a skirt extending downwardly over said lens carrier.

4. In a microscope, a body tube, a support having a shaped surface complementary to the shape of the body tube for receiving the body tube, a cylindrical stud fixed to said body tube, a cylindrical recess in the shaped surface of said support for receiving said stud and means carried by said support for forcing said stud into said recess and said tube against said shaped surface.

5. In a microscope, a body tube, a support having a surface complementary to the shape of the surface of the body tube for receiving the body tube, a stud on the body tube having a depression therein, a recess in the shaped surface of said support for receiving said stud, a wedge member slidably mounted in said support for cooperation with said depression for moving said stud to draw the body tube closely against said shaped surface, and means for actuating said wedge member.

GEORGE B. GALLASCH.